Sept. 30, 1969  R. G. NEIGHORN  3,469,504
IMPACT DISSIPATING DEVICE
Original Filed Aug 26, 1963  5 Sheets-Sheet 1
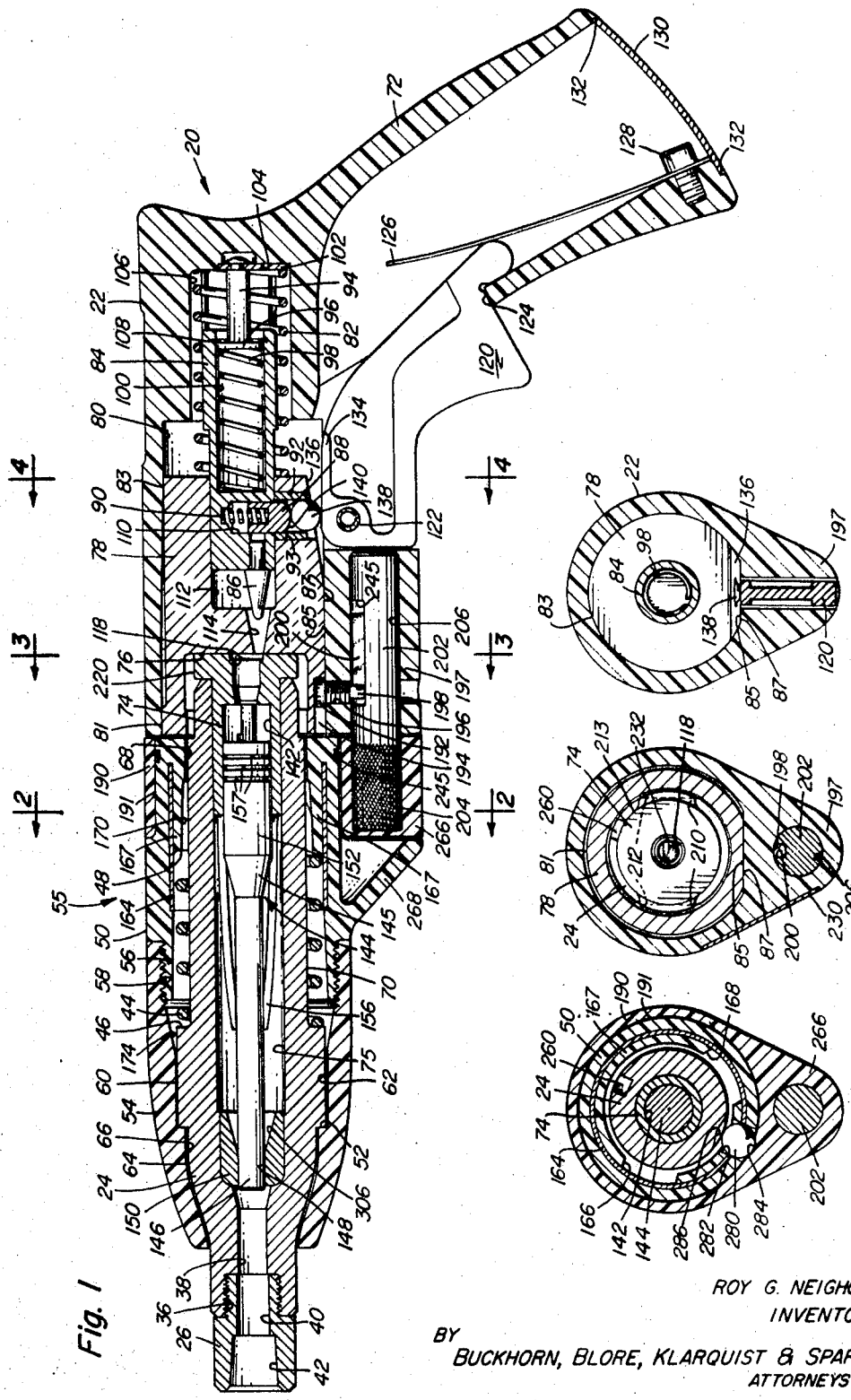
ROY G. NEIGHORN
INVENTOR.
BY
BUCKHORN, BLORE, KLARQUIST & SPARKMAN
ATTORNEYS

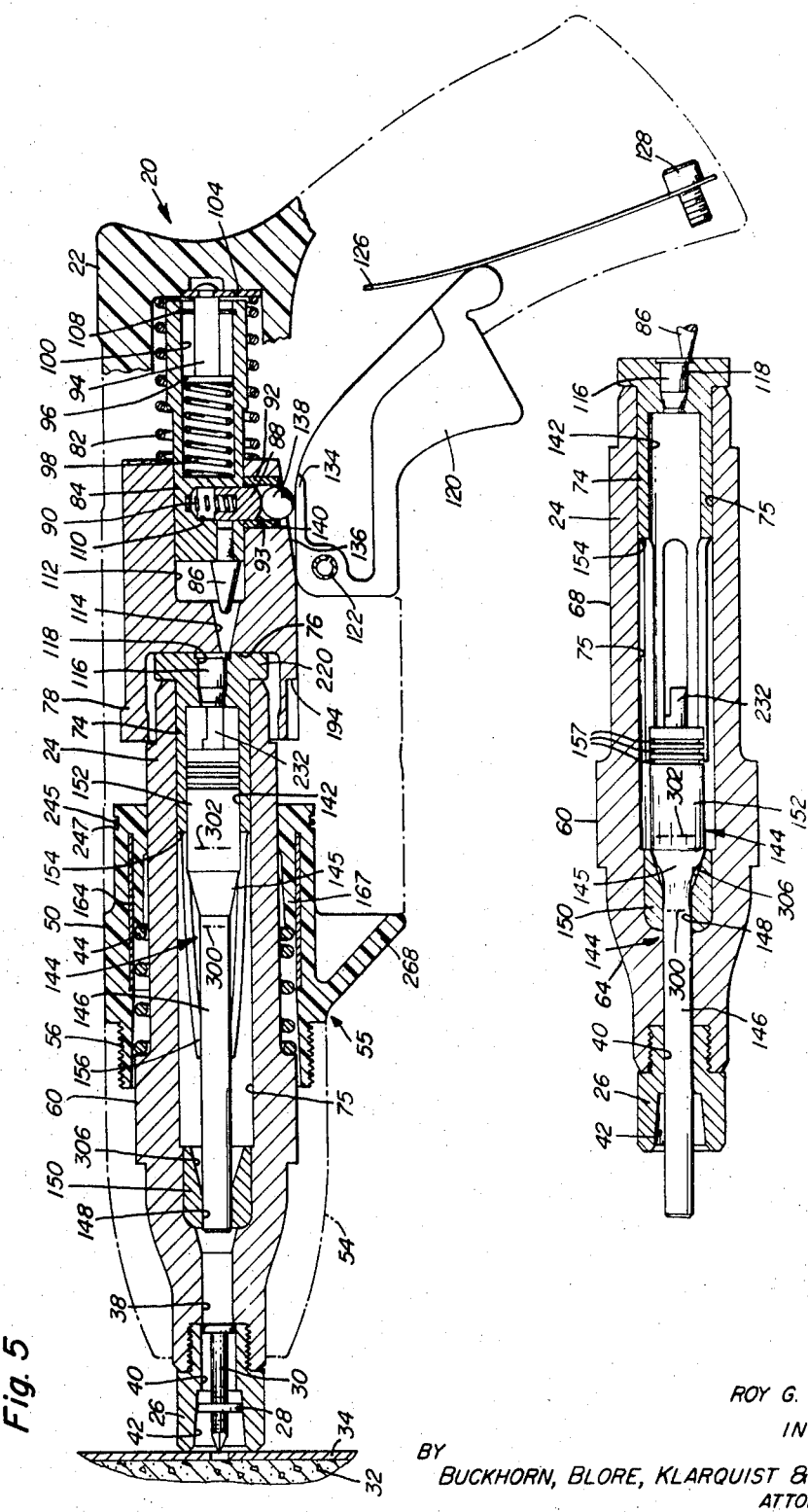

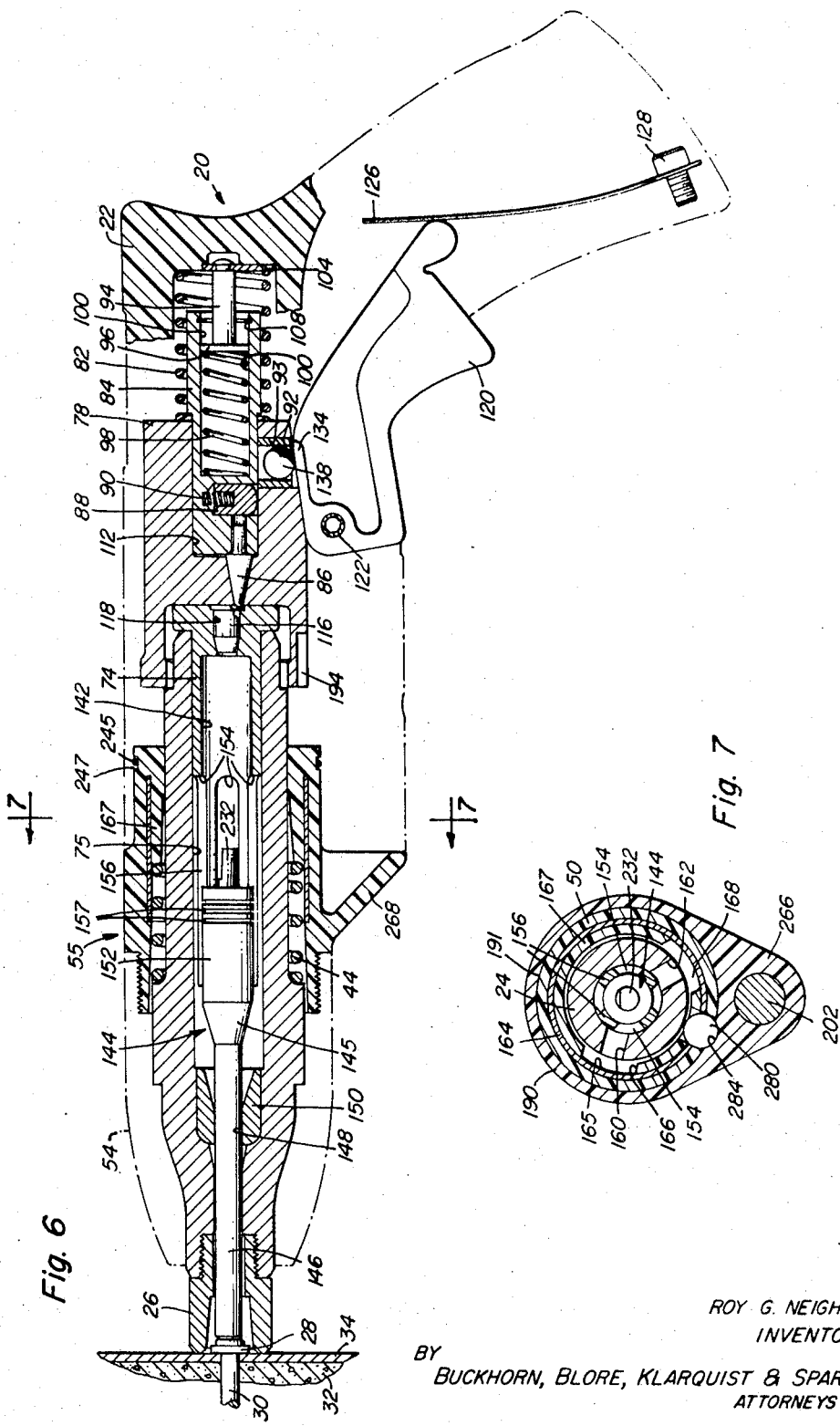

Sept. 30, 1969  R. G. NEIGHORN  3,469,504
IMPACT DISSIPATING DEVICE
Original Filed Aug 26, 1963  5 Sheets-Sheet 4
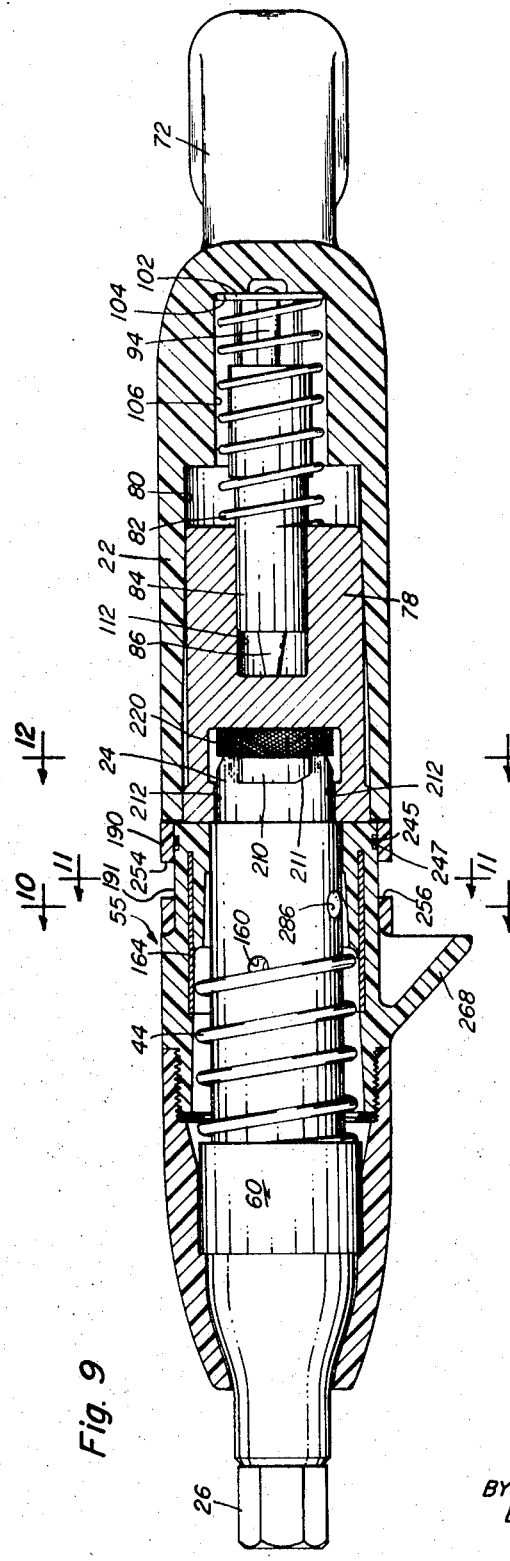
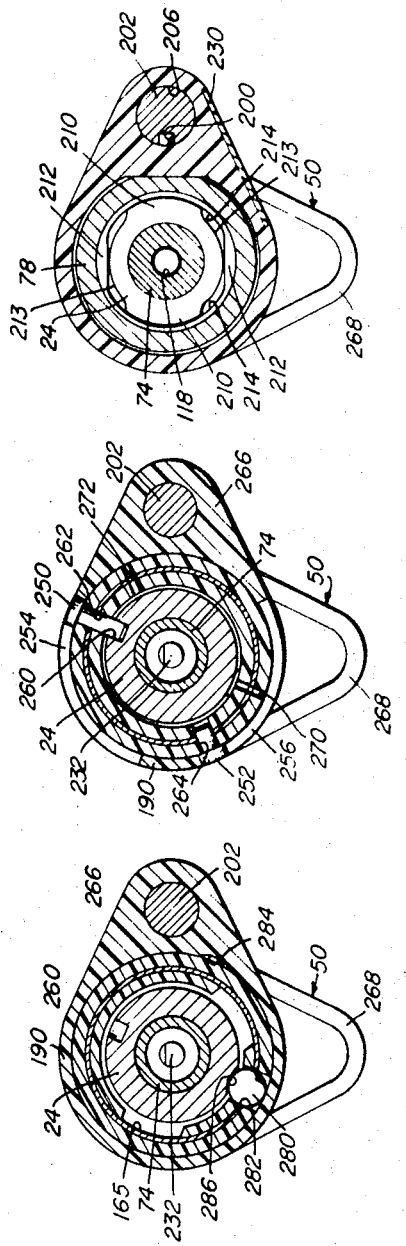
ROY G. NEIGHORN
INVENTOR.
BY
BUCKHORN, BLORE, KLARQUIST & SPARKMAN
ATTORNEYS Sept. 30, 1969          R. G. NEIGHORN          3,469,504
                      IMPACT DISSIPATING DEVICE
Original Filed Aug 26, 1963                     5 Sheets-Sheet 5
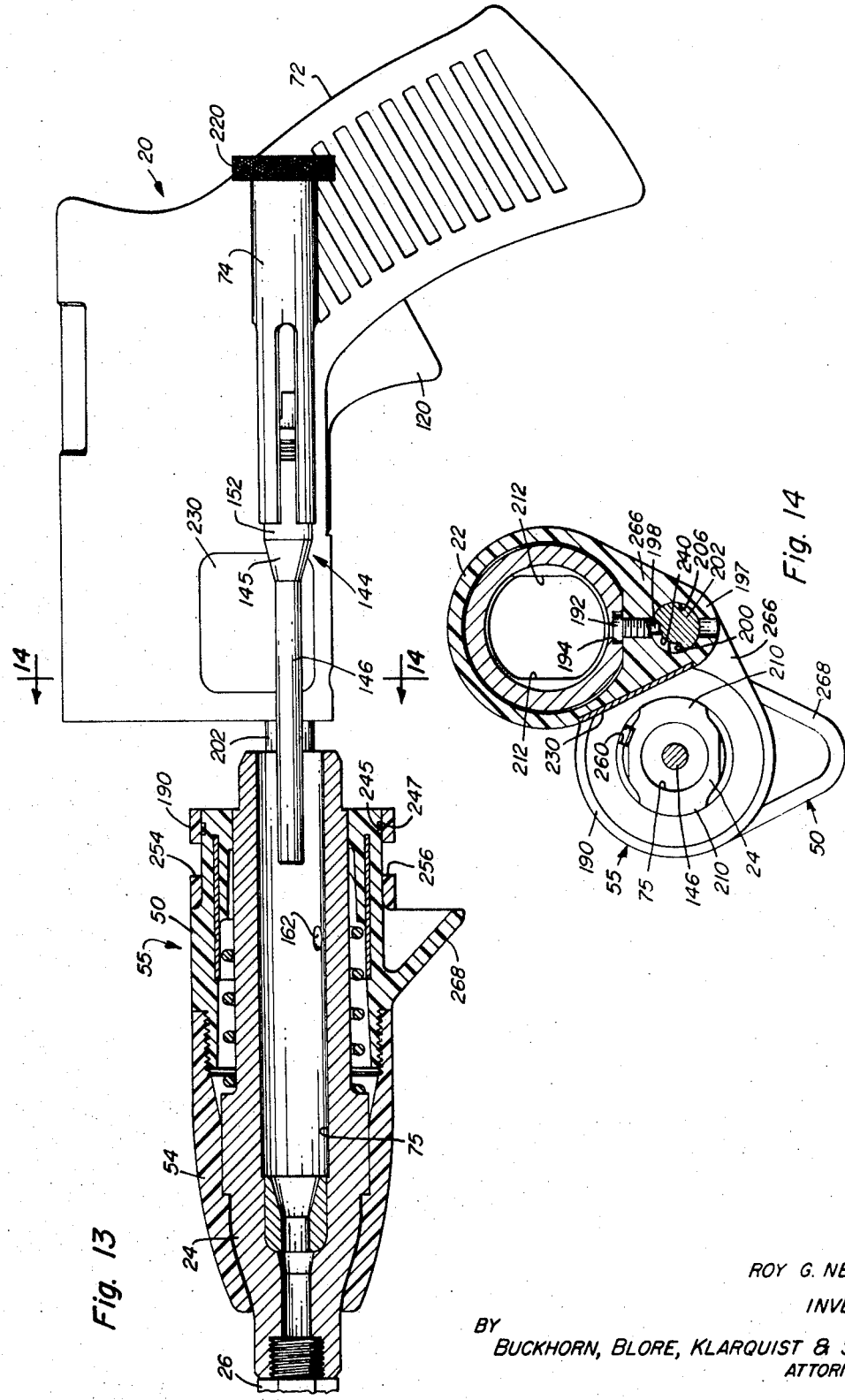
ROY G. NEIGHORN
INVENTOR.
BY
BUCKHORN, BLORE, KLARQUIST & SPARKMAN
ATTORNEYS

United States Patent Office 3,469,504
Patented Sept. 30, 1969

3,469,504
IMPACT DISSIPATING DEVICE
Roy G. Neighorn, Portland, Oreg., assignor to Omark Industries, Inc., Portland, Oreg., a corporation of Oregon
Continuation of application Ser. No. 554,610, Apr. 19, 1966, which is a continuation of application Ser. No. 304,463, Aug. 26, 1963. This application Dec. 14, 1967, Ser. No. 716,676
Int. Cl. F01b *11/02;* F16j *1/00*
U.S. Cl. 92—85                        4 Claims

ABSTRACT OF THE DISCLOSURE

A captive piston having a hard, enlarged head, a hard, reduced ram portion and a ductile tapered portion is adapted to have the tapered junction portion extruded by a tapered stop when the piston is overdriven. The bore of the barrel is slightly enlarged just beyond the stop and is closer fitting in a guide portion (38). This enlarged portion of the barrel bore permits slight expansion of extruded portions of the junction portion so that the piston is reusable. A headed power plug (74) has spring fingers frictionally engaging the piston to withdraw the piston from the barrel when the power plug is withdrawn from the barrel. The breech portion of the tool is removably joined to the barrel by a hinge ring (190) and a hinge shaft (202) splined to the breech to permit pulling the breech portion away from the barrel after the hinge ring is rotated on the barrel. The hinge shaft (202) also permits rotation of the breech portion to a position out of alignment with the barrel after the breech portion has been pulled away from the barrel.

Description

This application is copending with, and a continuation of, my prior application entitled Powder Actuated Tool, Ser. No. 554,610, filed Apr. 19, 1966, now abandoned, which is a continuation of my prior application Ser. No. 304,463, filed Aug. 26, 1963, for Powder Actuated Tool, now abandoned.

This invention relates to an impact dissipating device, and more particularly to a captive piston powder actuated tool.

An object of the invention is to provide a new and improved powder actuated tool.

Another object of the invention is to provide a new and improved captive piston powder actuated tool.

Yet another object of the invention is to provide a powder actuated tool having a barrel housing and a breech housing which are turned relative to each other from operative positions to open the tool together with a safety device preventing cocking of the tool when the housings are not in their operative positions and preventing turning of the housings from their operative positions when the tool is cocked.

A further object of the invention is to provide a powder actuated tool having a captive piston having an intermediate portion which is substantially more ductile than end portions thereof and a die-type stop so positioned as to cause the ductile portion of the piston to be drawn therethrough to dissipate the energy of the captive piston and prevent a portion thereof breaking off and being discharged as a projectile when the tool is fired and there is insufficient opposition to the movement of the captive piston as, for example, when there is no fastening element in the tool and the tool abuts a very soft object.

Another object of the invention is to provide a powder actuated tool which is light in weight, efficient and safe, durable, and is simple in construction.

Yet another object of the invention is to provide a powder actuated tool having a plastic barrel housing and also having a structure protecting the barrel housing from hot gases formed by firing an explosive cartridge in the tool.

A still further object of the invention is to provide a powder actuated tool having a minimum of fasteners, such as screws, rivets and the like.

The invention provides a powder actuated tool having a barrel portion and a breech portion which is movable relative to the barrel portion to open the tool to remove a fired power load shell and reload the tool. Preferably, the tool is opened by turning the breech portion in one direction from an operative position thereof to unlock the barrel portion and breech portion, pulling the breech portion relative to the barrel portion to separate the breech and barrel portions and turning the breech portion in the opposite direction to move the breech portion out of alignment with the barrel portion and expose the breech end of the barrel portion. It is also desirable that the barrel portion be movable longitudinally of the tool to cock the tool, and there preferably is provided a locking mechanism to prevent cocking movement of the barrel portion when the breech portion is not in operative position relative to the barrel portion and to prevent relative opening movement between the breech and barrel portions when the barrel portion is in a cocked position thereof. There also is preferably provided a captive piston having an elongated, forward, fastening element striking plunger, an enlarged rear piston portion and a tapered portion therebetween which is substantially more ductile than the plunger and is adapted to be drawn partially through a tapered, die-like stop in the barrel portion to dissipate energy when the tool is fired and the plunger encounters substantially no resistance to movement thereof.

In a powder actuated tool forming a specific embodiment of the invention, a barrel and breech block are mounted in a barrel housing and a breech housing which is mounted on the barrel housing for axial turning movement by a hinge ring assembly. To open the tool, the breech housing is first turned to uncouple the breech block and the barrel, is then pulled to pull the breech housing off the end of the barrel and then is turned on a hinge shaft connecting the breech housing pivotally to the hinge ring assembly on an axis parallel to and laterally offset from the barrel to provide easy access to the breech end of the barrel. A chambered power plug fits removably into the breech end of the barrel and has spring fingers frictionally gripping a captive piston including a forwardly positioned plunger of hard metal joined by a tapered intermediate portion of ductile metal to an enlarged piston portion of hard metal with transition portions extending from the ends of the intermediate portion short distances along the plunger and piston portion. The barrel carries a tapered, die-like, piston stop of hard metal through which the plunger slidably extends, and, when the tool is fired and the plunger meets with little or no resistance, the ductile intermediate portion of the piston strikes the piston stop and is drawn somewhat therethrough to dissipate the energy of the moving piston and prevent the plunger from breaking off and being discharged as a projectile from the tool. The barrel is provided with exhaust ports extending transversely to the exterior thereof and the barrel housing is composed of plastic material and has a stainless steel erosion sleeve positioned to prevent impingement on the plastic material of hot gases of explosion escaping from the exhaust ports. The barrel housing has a transverse bore therein along which a locking ball is movable, and the barrel has a recess therein into which the ball is forced by the hinge ring assembly whenever the breech housing is not in its operative position relative to the barrel housing so that the barrel cannot be moved to its cocking position. The hinge ring assembly has a recess therein adapted to receive the ball when the breech housing is in its operative position to permit the ball to move out of the recess in the barrel and allow cocking movement of the barrel and also to lock the breech housing against movement when the barrel is moved to its cocking position in which the recess in the barrel is out of alignment with the ball so that the barrel holds the ball in the recess in the hinge ring assembly.

A complete understanding of the invention may be obtained from the following detailed description of a powder actuated tool forming a specific embodiment thereof, when read in conjunction with the appended drawings, in which:

FIG. 1 is a longitudinal, vertical sectional view of a powder actuated tool forming one embodiment of the invention;

FIG. 2 is a vertical sectional view taken along line 2—2 of FIG. 1;

FIG. 3 is a vertical sectional view taken along line 3—3 of FIG. 1;

FIG. 4 is a vertical sectional view taken along line 4—4 of FIG. 1;

FIG. 5 is a fragmentary, longitudinal, vertical section similar to FIG. 1 but with the tool in cocked condition;

FIG. 6 is a view similar to FIG. 5 but with the tool shown in a fired condition;

FIG. 7 is a transverse, vertical sectional view taken along line 7—7 of FIG. 6;

FIG. 8 is a longitudinal sectional view of a portion of the tool of FIG. 1;

FIG. 9 is a longitudinal, vertical sectional view of the tool of FIG. 1 during the first stage of opening the tool;

FIG. 10 is a transverse, vertical sectional view taken along line 10—10 of FIG. 9;

FIG. 11 is a transverse, vertical sectional view taken along line 11—11 of FIG. 9;

FIG. 12 is a transverse, vertical sectional view taken along line 12—12 of FIG. 9;

FIG. 13 is a fragmentary, longitudinal, vertical sectional view of the powder actuated tool of FIG. 1 in an open condition; and FIG. 14 is a transverse, vertical sectional view taken along line 14—14 of FIG. 13.

Referring now in detail to the drawings, there is shown therein a powder actuated tool 20 including a breech housing or handle 22 preferably composed of a strong, tough, plastic compound such as, for example, an unfilled polycarbonate, one suitable compound being that sold by the General Electric Company under the trade name "Lexan." The tool also includes a barrel 24 of steel carrying a barrel nut 26 adapted to hold a washer 28 and a fastener element 30 to be driven into a wall 32 of concrete or the like to secure a sheet 34 to the wall. The barrel nut 26 is threaded into a tapped counterbore 36 concentric with a bore 38 in the barrel, and the nut 26 has a bore 40 aligned with the bore 38 and forming a continuation thereof, and also includes a tapered retaining socket 42 adapted to frictionally hold the washer 28.

A barrel spring 44 seated against a shoulder 46 of the barrel and against a shoulder 48 of a sleeve-like, middle housing assembly 50 (FIG. 1) urges the barrel 24 to the left, as viewed in FIG. 1, and the lefthand movement of the barrel is limited by an internal shoulder 52 in a sleeve-like, lower housing 54. The housing assembly 50 and housing 54 form a barrel housing 55. The housing assembly 50 and housing 54 have complementary, threaded connecting portions 56 and 58, respectively, and are preferably composed of a tough plastic material which may be the same material as that forming the handle 22. The barrel 24 has a cylindrical collar portion 60 slidable in counterbore 62 in the housing 54 and also has a tapered portion 64 fitting into a complementary tapered portion 66 formed in the housing 54. The middle housing assembly 50 has a guide passage 68 serving to guide a cylindrical portion 70 of the barrel.

In order to cock the tool 20, the user grasps a handle portion or grip 72, places the barrel nut 26 against the sheet 34 and pushes the tool 20 to the left, as viewed in FIG. 5. The barrel 24, of course, remains stationary as the breech housing 22 and barrel housing 55 move to the left relative thereto. This compresses the spring 44 and the barrel holds stationary a headed power plug 74 carried in bore 75 of the barrel 24. The power plug 74 abuts an end of a bore 76 of a breech block 78 and holds the breech block 78 against movement with breech housing 22 to compress a breech block return spring 82. The breech block is slidable in counterbore 80 formed in the breech housing 22, and has arcuate guiding lands 81 and 83 complementary in shape to the counterbore 80. The counterbore 80 is cylindrical except for a flat portion 85 (FIG. 3), and a flat bearing surface 87 on the breech block is slidable along the flat portion 85, which gives a keying action to aid in the assembly operation of the breech block with the breech housing as described hereinbelow. As the breech housing 22 moves to the left relative to the breech block 78, it also moves to the left relative to a sleeve-like firing pin holder 84 carrying a tapered firing pin 86, the firing pin holder being held in a retracted position relative to the breech block 78 by a rod-like, hardened steel sear 88, which is urged at this time by a spring 90 into a hardened steel bushing 92 press fitted into a bore 93 in the breech block. The movement of the breech housing 22 to the left relative to the breech block 78 also moves a firing pin return dog 94 to the left, to move an enlarged head 96 of the dog 94 against the action of and to compress a firing pin spring 98 seated between the head 96 and the end of an axial bore 100 in the firing pin holder 84. The firing pin return dog 94 has secured thereto at the righthand end thereof an enlarged head or washer member 102 seated in a socket 104 at the end of bore 106 in the breech housing 22, and is engaged by a breech block return spring 82. A split spring ring 108 seated partially in a corresponding groove in the firing pin holder 84 prevents movement of the head 96 out of the holder 84. The sear 88 is slidable in a bore 110 in the firing pin holder 84, and the firing pin holder 84 is slidable along a bore 112 in the breech block 78. The firing pin 86 is adapted to project through a tapered bore 114 in the breech block 78 and to strike a rim fire power load 116 (FIG. 8) held in a chamber 118 in the power plug 74. The firing pin (FIG. 5) always extends into the bore 114 to key the firing pin holder to the breech block, sufficiently that rounded nose 140 of the sear will enter the housing 92.

To fire the tool 20, with the tool in the fully cocked position, as illustrated in FIG. 5, the user pulls trigger 120 pivotally mounted on roll pin 122 carried by breech housing 22. The trigger is movable in a slot 124 (FIG. 1) in the grip 72 against a leaf spring 126 secured by screw 128 in the hollow grip 72 near the base of the grip. The trigger may be a known tough plastic material or may be die cast from a suitable aluminum alloy. A cover plate 130 fits into counterbore 132 with spring or snap action and is removable therefrom. Pulling the trigger 120 moves an actuator plate 134 upwardly, as permitted by a relieved or beveled portion 136 of the breech block 78 and, only when the breech block is in the cocked position thereof, movess a ball 138 upwardly in the bushing 92 to move the sear 88 upwardly until the outer edge of the rounded nose 140 of the sear 88 is above the bushing 92. The spring 98 then moves the firing pin holder 84 rapidly to the left, as viewed in FIG. 5, and the firing pin 86 strikes and fires the power load 116 (FIG. 8). The powder in the power load explodes and the combustion or explosion gases enter bore 142 in the power plug 74. This drives captive piston 144 to the left, as viewed in FIG. 5, along the power plug 74, and ram or plunger 146 slides along bore 148 in a die-like, hardened steel catching collar insert or stop 150 and through the bores 38 and 40 and strikes the head of the nail-like fastener element 30 into the wall 32. The piston has a tapered portion 145. The tool 20 is of the captive piston type, the piston 144 having a high momentum, low velocity drive so that danger from accidental firing thereof is minimized.

The explosion gases from the power load 116 (FIG. 8) move an enlarged piston portion 152 of the piston 144 until it clears the unslotted portion of the power plug 74 (FIG. 6) and, as the righthand end of the piston portion 152 moves to slots 154 extending along the power plug 74 between tempered spring fingers 156, the explosion gases escape through the slots 154 from behind the end of the piston. The piston is provided with annular grooves 157 near the righthand end thereof. The gases travel through the slots 154 between the tapered fingers 156 into transverse bores or exhaust ports 160 and 162 (FIG. 7) formed in the barrel 24, the hot gases impinging on an erosion protection sleeve or insert 164 embedded in the middle housing assembly 50. Inner skirt 167 of the housing assembly 50 has large, forwardly opening U-shaped notches or passages 166 and 168 adjacent the outlets of ports 160 and 162, respectively, to prevent the hot gases from the outlets of the ports from impinging directly on the plastic compound of the housing assembly 50. The notches 166 and 168 act as passages for escape of the gases along with relieved portions 170 (FIG. 1) of the skirt. The hot gases then travel along passages 166 and 168 and the relieved portions 170 in the housing assembly 50 and along clearances between the barrel 24 and the barrel housing 55.

The piston 144 moves to the position thereof shown in FIG. 6 to drive the fastener element 30 completely into the wall 32 through the sheet 34. At this time the tool 20 is fully fired, as illustrated in FIG. 6. The user then moves the tool away from the wall 32 and the springs 44 and 82 initially hold the barrel 24 and the breech block 78, respectively, against movement with the barrel housing 55 and breech housing 22 so that the parts of the tool assume the relative positions thereof shown in FIG. 1. Movement of the firing pin holder 84 with the breech block 78 is prevented by the split ring 108 and the head 96, and the sear 88 drops back into the bushing 92 to cock or reset the firing pin holder 84 relative to the breech block 78.

To eject the spent power load 116 (FIG. 6) and reload another power load, the tool 20 is opened. This is accomplished by the user grasping the barrel housing 55 and the grip 72 with opposite hands and turning the breech housing 22 from the position thereof shown in FIG. 1 to that shown in FIG. 9. This turns a hinge ring 190 relative to the barrel housing 55, the hinge ring 190 being rotatable on a reduced portion 191 of the middle housing assembly 50. As the breech housing is so turned, it turns the breech block 78 therewith by means of a head of socket head screw 192 (FIG. 1) projecting into a longitudinal splining notch or groove 194 in the breech block 78. The screw 192 is threaded into a tapped bore 196 formed in a lower, rib portion 197 of the breech housing 22 and has a pin end or shank 198 projecting into a longitudinal splining slot 200 formed in a hinge shaft 202 having a knurled end 204 anchored into the hinge ring 190. The shaft 202 is slidably and rotatably mounted in a bore 206 in the rib portion 197. The shaft 202 serves during this turning movement to key the breech housing 22 to the hinge ring 190. The hinge ring 190 is composed of a tough, strong material, which, as shown, may be a plastic compound such as, for example, unfilled polycarbonate and, of course, may be metal such as, for example, an aluminum alloy.

As best illustrated in FIGS. 9 and 12, the barrel 24 is provided at opposite sides thereof with a pair of lugs 210 having camming portions 211 and the breech block 78 is provided with a pair of inwardly projecting lugs 212 on opposite sides thereof. The lugs 210 and 212 form, in effect, a breech type lock, and when the handle 22 and the breech block 78 are in their operative position, as shown in FIG. 1, the barrel 24 is locked by these lugs to the breech block against longitudinal movement relative thereto. However, when the handle 22 and breech block 78 are turned to the positions thereof shown in FIGS. 9 and 12, the lugs 210 are completely out of alignment with the lugs 212 and are in alignment with enlarged openings 214 in the breech block 78, and the lugs 212 are aligned with openings formed by reduced portions 213. The breech block 78 then can be moved longitudinally relative to the barrel.

With the powder actuated tool 22 in the condition thereof shown in FIG. 9 in which the breech housing 22 is turned 90° relative to the normal or operative position thereof, the user pulls the breech housing 22 to the right relative to the barrel housing 55 and the barrel 24. This pulls the breech block 78 completely off the barrel 24 and the power plug 74, and the user then turns the breech housing 22 clockwise, as viewed in FIG. 12, on the hinge shaft 202 to the position thereof shown in FIGS. 13 and 14, an arcuate groove 240 providing clearance for shank 198 of the screw 192 for about 90° of turning movement. This swings the breech block 78 and the breech housing 22 completely away from the power plug 74. A knurled head 220 of the power plug 74 then is grasped by the user and is pulled out of the bore 75 in the barrel 24, and the spring fingers 156 gripping the piston 144 pull the piston out of the barrel. The plunger 146 is then struck against a metal striker plate 230 embedded in the handle 22 to cause an ejector 232 of the piston 144 to eject the spent power load shell. This also moves the piston 144 farther back into the power plug 74. A fresh power load then is placed in the chamber 118, and the power plug 74 and the piston 144 are placed back in the barrel 24. It should be noted that, when the tool 20 is in the open position as shown in FIGS. 13 and 14 and is held manually by the breech housing 22, gravity holds the hinge ring 190 and the barrel housing in the open positions thereof relative to the breech housing.

To reclose the tool 20, the operator grasps the barrel housing 55 and the grip 72, and turns the breech housing 22 counterclockwise on the hinge shaft 202, as viewed in FIG. 14, until the breech housing is aligned with the hinge ring 190, at which time the shank 198 of the screw 192 is aligned with splining slot 200. The hinge ring 190 is held against turning movement by frictional engagement therewith by an O-ring 245 seated in and projecting outwardly beyond an annular groove 247 in the middle housing assembly 50. This gives a resisting or braking action to insure that the hinge ring does not turn relative to the barrel housing 55 whenever the breech housing is turned on the hinge shaft 202. The breech block 78 then is aligned longitudinally with the power plug 74 and the barrel 24. The user then pushes the breech housing 22 toward the barrel 24 to put the tool 20 in the condition shown in FIG. 9, in which the forward end of the breech housing 22 engages the hinge ring 190, and the breech block 78 extends partially over the barrel 24 and over the head 76 of the power plug 74. Then the user turns the handle 22 clockwise, as viewed in FIG. 12, 90° to place the tool in the condition shown in FIG. 1. A fastener element 30 and washer 28 then are placed in the nut 26, and the tool is pressed against the wall into which the fastener element is to be driven, which cocks the tool and the tool is again fired.

The hinge ring 190 (FIGS. 9 and 11) is held against longitudinal movement relative to the middle housing assembly 50 and the barrel 24 by headed pins 250 and 252 (FIG. 11). The heads of the pins 250 and 252 project into arcuate slots 254 and 256 (FIGS. 9 and 11) in the hinge ring to permit about 90° rotation of the hinge ring relative to the middle housing assembly 50 and barrel 24, and prevent longitudinal movement between the hinge ring and the middle housing assembly. The end of the pin 250 projects into a splining slot 260 extending along the barrel 24 and open at the breech end of the barrel to spline the barrel 24 to the middle housing assembly 50, and is press fitted into a bore 262 in the housing assembly 50. The pin 252 is press fitted into a bore 264 in the middle housing assembly 50. The hinge ring 190 is provided with a lower rib 266 carrying the shaft 202 and the middle housing assembly 50 has a lower projecting portion 268 blending the cylindrical portion of the middle housing assembly 50 to the somewhat ovate shaped hinge ring 190.

The headed screw 192 projects into the longitudinal slot 194 and limits the travel of the breech block 78 to the left, as viewed in FIG. 1, relative to the breech housing 22 while permitting movement of the breech block 78 to the right, as viewed in FIG. 1, relative to the breech housing 22. In assembly, to lock the breech block 78 and the parts carried by the breech housing 22 located to the right of the breech block 78, after pushing the breech block 78 to the right sufficiently to clear the hole 196, the screw 192 is screwed into the tapped bore 196, after which the breech block is released and the closed end of the slot 194 comes up against the head of the screw 192. This stops the breech block against further movement to the left relative to the breech housing 22. To permit removal of the pins 250 and 252 after the barrel 24 has been removed from the middle housing assembly 50, there is provided a hole 270 (FIG. 11) to permit a rod (not shown) to be pressed against the end of the pin 250 to drive out the pin 250. The pin 252 may be removed from the bore 264 similarly through a service hole 272 aligned with the bore 264.

In order to prevent movement of the barrel 24 from its extreme forward position relative to the barrel housing 55 toward its cocking position whenever the tool is in a partially open position or fully open position, there is provided a locking ball 280 (FIGS. 2 and 10) which is freely slidable along bore 282 extending through the middle housing assembly 50 and the protective sleeve 164. The ball 280 is of a diameter substantially greater than the thickness of the portion of the middle housing assembly 50 through which the bore 282 extends. Whenever the breech housing 22 is in its operative position in which it is aligned with the middle housing assembly 50 for firing or cocking, as illustrated in FIG. 1, the hinge ring 190 has a recess 282 aligned with and just below the bore 282 into which the ball 280 drops so that the ball is completely out of the way of the barrel 24 to permit free axial movement of the barrel 24. However, whenever the breech housing 22 and the hinge ring 90 are turned from the positions thereof shown in FIG. 1, the hinge ring 190 pushes the ball 280 up into a locking recess 286 in the barrel 24, and the ball prevents longitudinal movement of the barrel 24 relative to the middle housing assembly 50. Hence, if the breech housing 22 is not in operative position for firing, the barrel 24 cannot be moved in the cocking direction relative to the handle 22. The ball also locks the barrel 24 in its extreme forward position relative to the barrel housing 55 when the tool is open and during opening and closing of the tool. Whenever the barrel 24 is not in its extreme forward position relative to the barrel housing 55, the ball 280 is held in the recess 284 in the hinge ring 190 to prevent rotation of the hinge ring relative to the barrel housing. Thus, the tool cannot be opened when the barrel is at all near its cocked position.

The powder actuated tool 20 is of the captive piston type which drives the piston 144 at a rather moderate velocity such that the fastener element 30, in the event that the tool is fired without being against a solid wall, leaves the barrel at a much lower velocity than fastener elements from non-piston type tools and does not act as a dangerous projectile. However, in the event that the tool is placed up against an object which is soft or not solid, and no fastener element 30 is positioned therein, the velocity of the piston 144 is sufficiently high that if the entire piston 144 were of hardened material, the plunger 146 would shear from the remainder thereof and would travel on out of the tool barrel and possibly do some damage. In order to prevent this in such conditions when there is little or no resistance to movement of the piston, the momentum of the piston is dissipated by tempering the tapered portion 145 to make it softer and more ductile than the portions of the piston 144 to the left of the line 300 and to the right of the line 302, as viewed in FIG. 8, and the insert 150 is composed of hard steel so that it acts somewhat as a drawing die. Hence, as the enlarged piston portion 152 strikes the insert 150, the piston tends to be drawn and extruded through the insert 150, which has a tapered portion 306 along with the smaller, cylindrical bore 148 to which the tapered portion 306 blends. The portion of the plunger 146 between the line 300 and the adjacent end of tapered portion 145 blends in ductility from that of the main portion of the plunger at the line 300 to the higher ductility of the tapered portion at the forward end of the tapered portion. The portion of the piston portion 152 to the right of the line 302 is harder and much less ductile than the tapered portion 145. The portion of the piston portion 152 between the line 302 and the righthand end of the tapered portion 145 blends from the lower ductility of the main portion of the piston at the line 302 to the higher ductility of the tapered portion at the portion of the piston adjoining the tapered portion. One suitable material for the insert 150 is a steel having the following composition: .60% by weight carbon, .70% by weight manganese, 1.85% by weight silicon, .45% by weight vanadium, and remainder iron. The piston 144 is made of a hardenable steel having the following composition: .50% by weight carbon, .75% by weight silicon, .20% by weight vanadium, 1.15% by weight chromium, 2.50% by weight tungsten, and remainder iron. The soft or ductile tapered portion 145 is tempered to a Rockwell C scale hardness of between about 45 and 49, while the portions of the piston assembly 144 to the left of the line 300, as viewed in FIG. 8, and to the right of line 302, have a hardness of about 57 to 61 on the Rockwell C hardness scale. In one captive piston constructed in accordance with the invention, the plunger 156 had a diameter of about one-quarter of an inch, the piston 152 had a diameter of about seven-sixteenths of an inch, the length of a tapered portion was about three-eighths of an inch, the length from the line 300 to the lefthand end of the tapered portion 145 was about one-eighth of an inch, and the length from the line 302 to the righthand end of the tapered portion 145 was about three-eighths of an inch. This extrusion and/or drawing of the softer portion of the piston 144 occuring during accidental firing of the powder actuated tool sometimes makes the piston assembly 144 unsuitable for further use and sometimes wedges the piston 144 in the insert 150, as illustrated in FIG. 8. However, the piston 144 will not break in two and is easily removable from the barrel 24 and piston stop 150 merely by tapping the lefthand end of the piston 144, as viewed in FIG. 8, and a new piston can be substituted therefor.

The above-described powder actuated tool 20 is very safe and also very efficient in its operation. It also is very simple and inexpensive in its manufacture, while being a very rugged, durable tool, as well as highly dependable.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a powder actual tool,
a one-piece piston having a plunger of a predetermined diameter, a piston portion of a diameter substantially larger than the plunger and a tapered portion joining the plunger and the piston portion, the piston being composed of steel, the plunger being hardened from a point spaced closely to the tapered portion to the other end thereof, the piston portion being hardened from a point spaced closely to the tapered portion to the other end thereof, the portion of the piston between said points being ductile, a barrel having a bore therein, said piston being relatively movable within said barrel, a hardened piston stop positioned in said bore and having a passage slidably receiving the plunger and having a tapered portion generally complementary to the tapered portion of the piston, means fixedly positioning said stop in said bore, and means for driving the piston with high momentum along the barrel in a direction such that the tapered portion of the piston enters the tapered portion of the passage when little or no resistance is encountered by the plunger and the energy of the piston is dissipated by drawing the tapered portion partially through the passage.

2. In combination, a stop member having a passage therethrough including a bore portion of a predetermined diameter and an enlarged entrance portion joining one end of the bore portion and tapering down at one end thereof to the bore portion at said one end of the bore portion, the other end of the entrance portion remote from said one end of the bore portion having a second predetermined diameter substantially larger than that of the bore portion, an elongated rod-like member having a cylindrical shank portion of a predetermined diameter sufficiently small to slidably engage the bore portion and also having an enlarged head portion and a tapered portion joining the head portion and the shank portion, the tapered portion being complementary to and adapted to enter the entrance portion of the passage, the portion of the stop member defining the entrance portion of the passage having a predetermined hardness, at least the end portion of the head portion adjacent the tapered portion thereof being highly ductile and substantially softer than the portion of the stop member defining the entrance portion of the passage, whereby said end portion of the head portion is adapted to be extruded into the passage when the head portion is forced into the passage, guide means positioned beyond the exit end of the bore portion and closely and slidably engaging the cylindrical shank portion for supporting the shank portion when overdriving occurs, and the tapered portion and the head portion are extruded, the guide means permitting unsupported free movement of the shank portion forwardly of the stop member as the tapered portion and the head portion are extruded which elongates the shank portion.

3. The combination of claim 2 wherein the guide means is spaced from the exit end of the stop member to provide an enlarged clearance portion positioned therebetween and tapering from the stop member to the guide means.

4. The combination of claim 2 wherein the guide means comprises a barrel member having a bore therein fitting closely on the shank portion and also having a counterbore receiving the stop member.

References Cited

UNITED STATES PATENTS

| 1,466,968 | 9/1923 | Smith | 123—7 |
| 1,825,632 | 9/1931 | Korvin-Kroukovsky et al. | 92—85 X |
| 2,260,070 | 10/1941 | Wilhide | 92—15 X |
| 2,787,984 | 4/1957 | Wahlsten | 92—172 X |
| 2,820,433 | 1/1958 | Pyk | 173—127 |
| 2,875,730 | 3/1959 | Carpenter et al | 92—85 X |
| 2,879,986 | 3/1959 | Maier | 92—85 X |
| 3,042,004 | 7/1962 | Fischer et al. | 173—139 X |
| 3,060,437 | 10/1962 | Henning et al. | 227—9 |
| 3,063,054 | 11/1962 | Henning et al. | 227—11 |
| 3,111,673 | 11/1963 | Henning | 227—8 |
| 3,168,744 | 2/1965 | Kvavle | 227—8 |
| 3,172,119 | 3/1965 | Siddons | 227—10 |
| 3,239,121 | 3/1966 | Kopf et al. | 227—10 |

MARTIN P. SCHWADRON, Primary Examiner

I. C. COHEN, Assistant Examiner

U.S. Cl. X.R.

92—172; 60—26.1; 173—127, 139; 227—10